United States Patent
Gundavelli et al.

(10) Patent No.: US 11,445,344 B2
(45) Date of Patent: Sep. 13, 2022

(54) APPLICATION INITIATED NETWORK TRIGGER FOR SWITCHING A USER DEVICE BETWEEN MUTUALLY EXCLUSIVE NETWORK SLICES

(71) Applicant: Cisco Technology, Inc., San Jose, CA (US)

(72) Inventors: Srinath Gundavelli, San Jose, CA (US); Vimal Srivastava, Bangalore (IN); Aeneas Sean Dodd-Noble, Andover, MA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 165 days.

(21) Appl. No.: 17/015,258

(22) Filed: Sep. 9, 2020

(65) Prior Publication Data
US 2022/0078590 A1 Mar. 10, 2022

(51) Int. Cl.
H04W 4/50 (2018.01)
H04W 8/18 (2009.01)
H04W 76/10 (2018.01)
H04W 76/30 (2018.01)

(52) U.S. Cl.
CPC ............ *H04W 4/50* (2018.02); *H04W 8/18* (2013.01); *H04W 76/10* (2018.02); *H04W 76/30* (2018.02)

(58) Field of Classification Search
CPC ......... H04W 4/50; H04W 8/18; H04W 76/10; H04W 76/30
See application file for complete search history.

(56) References Cited

U.S. PATENT DOCUMENTS

2017/0164212 A1* 6/2017 Opsenica ............ G06F 16/41
2019/0357122 A1* 11/2019 Li ........................ H04W 76/18
(Continued)

FOREIGN PATENT DOCUMENTS

| GN | 109951440 A | 6/2019 |
| WO | 2019245921 A1 | 12/2019 |
| WO | 2020102989 A1 | 5/2020 |

OTHER PUBLICATIONS

Qing Wang et al., "IP flow mobility trigger mechanism in heterogeneous wireless networks", Journal of Information and Computational Science, 10:7, May 1, 2013, 13 pages.
(Continued)

Primary Examiner — Joseph E Dean, Jr.
(74) Attorney, Agent, or Firm — Edell, Shapiro & Finnan, LLC (57) ABSTRACT

A Network Exposure Function (NEF) relays a trigger from a remote application function to a user device and causes the user device to switch between mutually exclusive network slices. The NEF stores a mapping associating device modes with network slices. The NEF also determines that a user device is operating in a first device mode using a first network slice. The NEF obtains a trigger from the remote application function identifying the user device and a second device mode. The NEF determines that the second device mode is associated with a second network slice that is mutually exclusive to the first network slice. The NEF provides a notification to the user device, causing the user device to end a first data session on the first network slice and to initiate a second data session on the second network slice.

20 Claims, 7 Drawing Sheets

(56) References Cited

U.S. PATENT DOCUMENTS

2020/0008139 A1   1/2020  Lai et al.
2020/0053643 A1*  2/2020  Lee .................... H04W 68/005

OTHER PUBLICATIONS

S. Gundavelli, Ed. et al., "Flow-Binding Support for Mobile IP", Internet Engineering Task Force (IETF), Aug. 2015, 19 pages.
3GPP, "3rd Generation Partnership Project; Technical Specification Group Services and System Aspects; Study on Enhancement of Network Slicing (Release 16)", 3GPP TR 23.740 V16.0.0 (Dec. 2018), 70 pages.

* cited by examiner

APPLICATION INITIATED NETWORK TRIGGER FOR SWITCHING A USER DEVICE BETWEEN MUTUALLY EXCLUSIVE NETWORK SLICES

TECHNICAL FIELD

The present disclosure relates to wireless network access, particularly with respect to accessing mutually exclusive network slices.

BACKGROUND

Network slicing provides for multiple independent logical networks to operate over a shared physical infrastructure. Fifth Generation (5G) systems include the concept of mutually exclusive network slices. An operator can mark two slice groups as mutually exclusive, based on business logic and services enabled on each network slice. The network will then ensure that a User Equipment (UE) will not be permitted to concurrently access any two network slices from these mutually exclusive slice groups. For instance, a UE may be connected to either a daytime network slice or a nighttime network slice, but not to both network slices at the same time.

DESCRIPTION OF EXAMPLE EMBODIMENTS

Overview

A computer implemented method is provided to relay a trigger from a remote application function to a user device and cause the user device to switch between mutually exclusive network slices. The method includes storing a mapping associating each of a plurality of device modes with one of a plurality of network slices. The method also includes determining that a user device is operating in a first device mode of the plurality of device modes using a first network slice among the plurality of network slices. The method further includes obtaining a trigger from a remote application function identifying the user device and a second device mode of the plurality of device modes. The method includes determining that the second device mode is associated with a second network slice that is mutually exclusive to the first network slice. The method also includes providing a notification to the user device, causing the user device to end a first data session on the first network slice and to initiate a second data session on the second network slice.

Example Embodiments

Mutually exclusive network slices may be leveraged into many practical and useful applications. In one example, an Internet of Things (IoT) device is configured with two device modes, "Operations" and "Maintenance." In the Operations mode, the device may be connected to an Ultra-Reliable, Low Latency Communication (URLLC) slice with relatively low bandwidth. In the Maintenance mode, the device may be connected to a network slice with higher bandwidth that can support diagnostics/troubleshooting messages or perform a firmware upgrade. The services provided on these slices would be different, and may conflict with each other. As a result, concurrent access to both of these slices may result in a negative impact to the service, with some undesirable outcomes.

Support for mutually exclusive network slices typically rely on the UE being notified that network slices are mutually exclusive and require the UE to determine whether to connect to any network slice that may be mutually exclusive to a network slice to which the UE is currently connected. In one example, the network pushes the mutually exclusive network slice configuration from the Policy Control Function (PCF) or Unified Data Management (UDM) to the UE, and the UE is configured to confirm the network requirements around accessing mutually exclusive network slices. The techniques presented herein enable the network (e.g., a remote application function on a data network) to trigger the UE to move between mutually exclusive network slices. In one example, the UE may be triggered to shift between an operations slice and a diagnostic slice based on a trigger from a remote application function, or on the detection of a predetermined network condition.

There are many applications in which there may be a need for the network, on behalf of a remote application, to trigger a UE to switch between mutually exclusive network slices. For instance, a manufacturing environment may include hundreds of thousands of IoT devices connected to a high-performance URLLC network slice. As part of the periodic network maintenance, the network administrator may need to perform maintenance on each of these devices, which may require a different set of network resources. The network resources needed for the maintenance functions may not be available on the currently connected network slice (i.e., the URLLC slice), or the maintenance functions may adversely affect the performance of the network slice to an unacceptable degree. With the techniques presented herein, the administrator may trigger one or more of the devices to move to an alternative network slice, which has the resources to perform the maintenance functions. Shifting these devices to the alternative network slice ensures that there is no service impact to other devices on the high performance network slice, and also ensures that the application behavior on the UE is not impacted by the operation of the maintenance functions.

Figure 1:
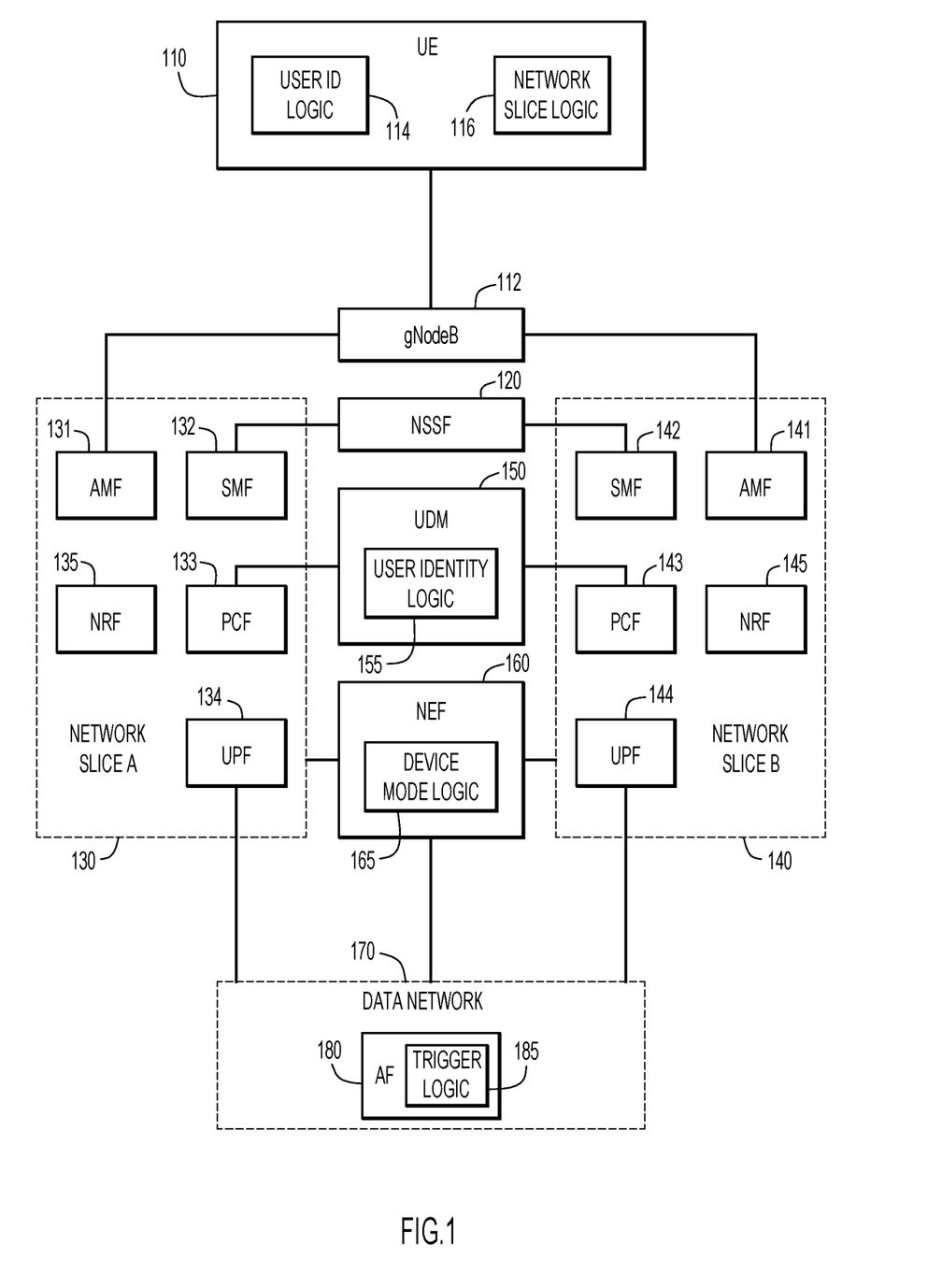
FIG. 1 is a simplified block diagram of a 5G system configured to operate with mutually exclusive network slices, according to an example embodiment.

Referring now to FIG. 1, a 5G system configured with two network slices is shown. A UE 110 is configured to connect to the 5G system via a next Generation node B (gNodeB) 112. The UE 110 may include user identity logic 114 that associates different user profiles of the UE 110 with different network addresses for the UE 110. Additionally, the UE 110 may include network slice logic 116 that stores configuration details for different network slices available to the UE 110.

The 5G system includes a Network Slice Selection Function (NSSF) 120 configured to select an appropriate network slice for the UE 110. The network slice 130 includes an Access Management Function (AMF) 131, a Session Management Function (SMF) 132, a Policy Control Function (PCF) 133, a User Plane Function (UPF) 134, and Network Repository Function (NRF) 135. The AMF 131 is configured to control the access of the UE 110 to the network slice 130 via the gNodeB 112. The SMF 132 is configured to manage Protocol Data Unit (PDU) sessions over the network slice 130 for the UE 110. The PCF 133 is configured to manage network policies in the control plane of the network slice 130. The UPF 134 is configured to manage the data plane connections over the network slice 130 for the UE 110. The NRF 135 is configured to store information associated with the functions of the network slice 130 (e.g., AMF 131, SMF 132, PCF 133, UPF 134, etc.).

Similarly, the network slice 140 includes an AMF 141, an SMF 142, a PCF 143, a UPF 144, and an NRF 145. The AMF 141 is configured to control the access of the UE 110 to the network slice 140 via the gNodeB 112. The SMF 142 is configured to manage PDU sessions over the network slice 140 for the UE 110. The PCF 143 is configured to manage network policies in the control plane of the network slice 140. The UPF 144 is configured to manage the data plane connections over the network slice 140 for the UE 110. The NRF 145 is configured to store information associated with the functions of the network slice 140 (e.g., AMF 141, SMF 142, PCF 143, UPF 144, etc.).

The 5G system also includes a Unified Data Management (UDM) 150 to enforce user specific policies in the 5G system. The UDM 150 includes user identity logic 155 that is configured to interact with the PCF 133 and PCF 143 to determine appropriate policy actions for connections the UE 110 may make over the network slices 130 and 140, respectively. The user identity logic 155 may store associations between device identities, between device identities and network slices, and between network slices (e.g., whether two network slices are mutually exclusive).

The 5G system further includes a Network Exposure Function (NEF) 160 that is configured to support services provided by external applications. The NEF 160 includes device mode logic 165 that is configured to store associations between device modes of the user devices (e.g., UE 110) and network slices designed to support the user devices in each device mode.

Both network slices 130 and 140 of the 5G system connect to a data network 170 (e.g., the public Internet) to allow the UE 110 to access data services provided by an Application Function (AF) 180. The AF 180 includes a trigger logic 185 that enables the AF 180 to cause the UE 110 shift between mutually exclusive network slices, as described further hereinafter.

Figure 2:
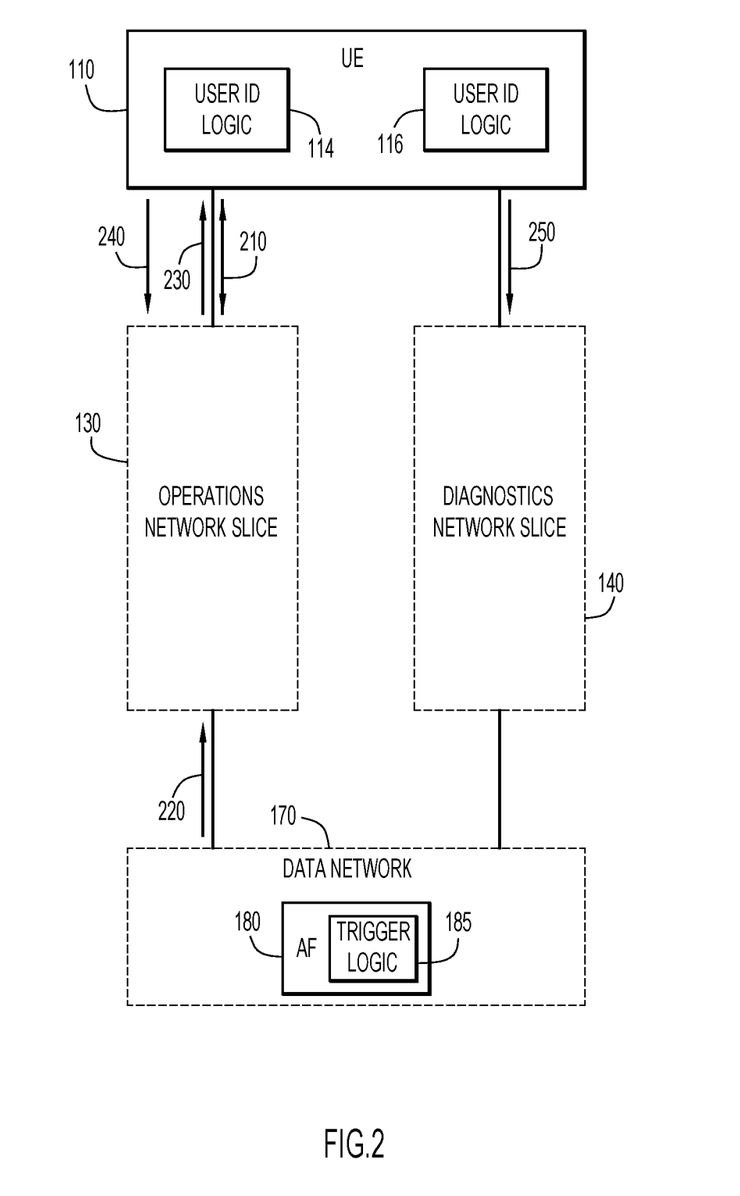
FIG. 2 is a simplified block diagram illustrating a remote application function triggering a UE to switch connections between mutually exclusive network slices, according to an example embodiment.

Referring now to FIG. 2, a simplified block diagram illustrates an example of the messages passed between AF 180 and the UE 110 that cause the UE 110 to shift between mutually exclusive network slices 130 and 140. In this example, the network slice 130 is also described as the operations network slice 130 and may be a URLLC network configured to provide low latency service to the UE 110. The network slice 140 is also described as the diagnostics network slice 140, and may provide a relatively higher bandwidth connection to the UE 110 at the expense of increased latency and/or other network features.

Initially, the UE 110 connects to the operations network slice 130 in an exchange 210. After the exchange 210, the UE 110 connects to the external data network 170 via the operations network slice 130. To trigger the 5G system to cause the UE 110 to switch to the mutually exclusive diagnostics network slice 140, the AF 180 sends a message 220 to the 5G system (e.g., to the NEF 160 as shown in FIG. 1. In one example, the message 220 may include additional parameters related to the switch between mutually exclusive network slices. For instance, the message 220 may identify the diagnostics network slice 140 as the network slice to which the UE 110 is directed to switch. The message 220 may also include an indication of a particular user profile that the UE 110 should use on the diagnostics network slice 140. The message 220 may further include a time value indicating the UE 110 should switch to the diagnostics network slice 140. The time value may be a relative time value (e.g., in 10 minutes) or an absolute time value (e.g., 3 AM).

The operations network slice 130 sends a trigger message 230 to the UE 110 with any related parameters supplied by the AF 180 in the message 220. The UE 110 receives the trigger message 230 and sends a message 240 to terminate the network connection with the operations network slice 130. After the message 240 terminates the network connection with the operations network slice 130, the UE 110 sends a message 250 to initiate a connection with the diagnostics network slice 140 under the conditions specified in the parameters supplied by the AF 180 in the message 220.

In one example, the parameters that are part of the trigger message 230 from the network to the UE 110 may include the time the UE is expected to switch network slices, an identifier of the diagnostics network slice 140, and a user profile (e.g., a Universal Subscriber Identity Module) that the UE 110 is required to use for the new connection to the diagnostics network slice 140. Some specific examples of network trigger messages 230 sent to the UE 110 on behalf of the AF 180 and the use cases for each trigger message are listed in Table 1.

TABLE 1

| Examples of Trigger Message sent on behalf of Application Function | | | | |
|---|---|---|---|---|
| Example Trigger | Target Slice | USIM Identity | Time | Use case |
| T1 | X | | | AF directs the UE to detach from the current slice and attach to a predetermined mutually exclusive slice |
| T2 | Diagnostics | | | AF directs the UE to detach |

TABLE 1-continued

Examples of Trigger Message sent on behalf of Application Function

| Example Trigger | Target Slice | USIM Identity | Time | Use case |
|---|---|---|---|---|
| | Slice | | | from the current slice and attach to the diagnostics slice |
| T3 | Diagnostics Slice | Administrator | @ 3 AM UTC | AF directs the UE to detach from the current slice and attach to the diagnostics slice with the Administrator user profile at 3 AM UTC |
| T4 | Operations Slice | Employee A | +10 minutes | AF directs the UE to detach from the current slice and attach to the operations slice with the Employee A user profile in 10 minutes from the current time. |

The 5G systems described in FIG. 1 and FIG. 2, as well as the system described hereinafter, are examples of systems with two mutually exclusive network slices 130 and 140. However, the techniques described herein may also be applied to system with more than two mutually exclusive network slices. Additionally, the labels of "operations" network slice and "diagnostics" network slice are used as examples, and other labels may be applied to the network slices. Similarly, the labels of an "operational" device mode or "maintenance" device mode described hereinafter are also used as examples. Device modes with other labels may also benefit from the techniques described herein.

Figure 3A:
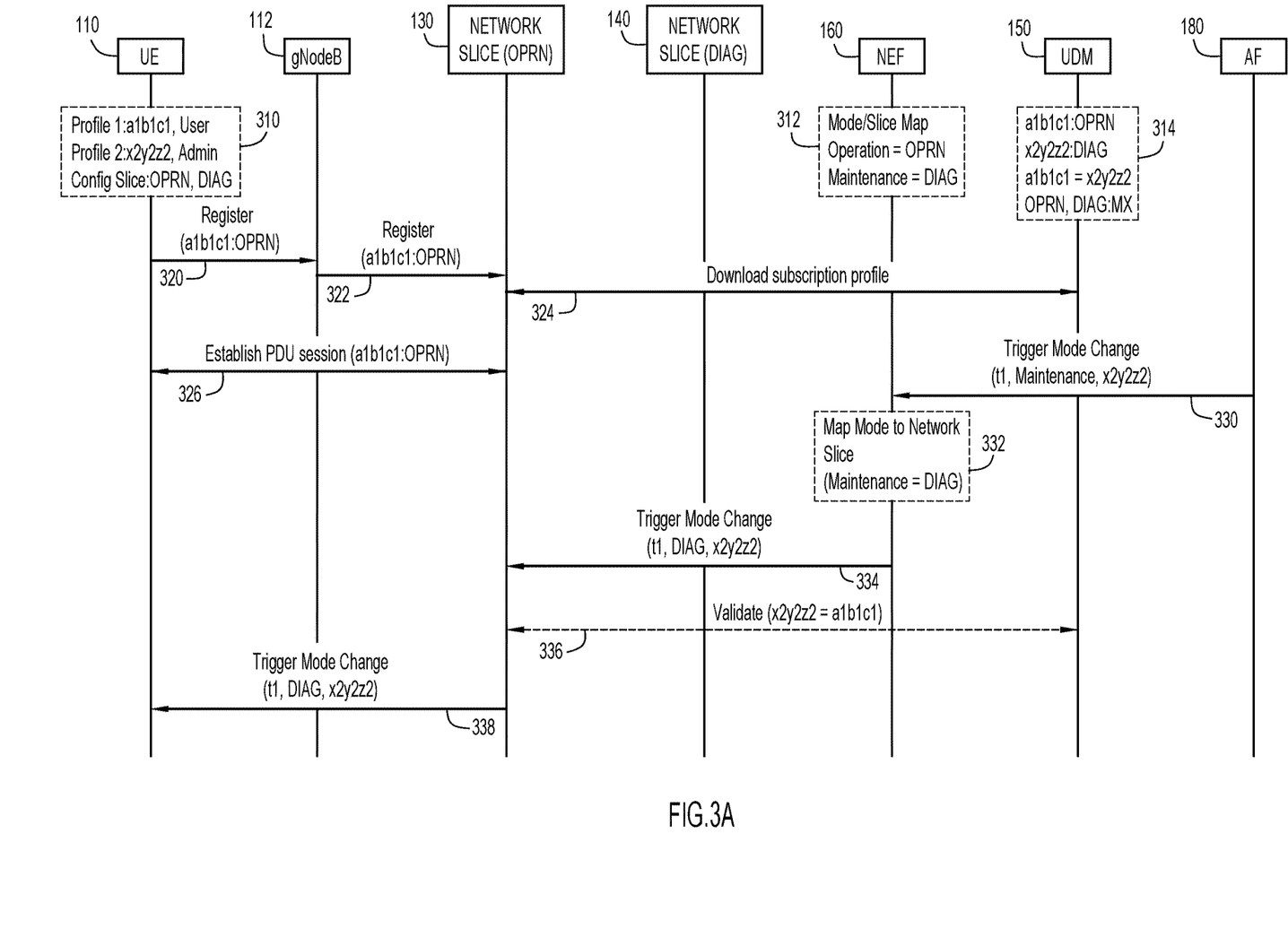
FIG. 3A illustrates messages passed in a 5G system to enable a remote application function to trigger a change in network connection for a UE, according to an example embodiment.

Referring now to FIG. 3A, a message flow diagram illustrates an example of an external application function 180 triggering a UE 110 to switch between mutually exclusive network slices 130 and 140. In this example, the UE 110 is a dual profile device that is programmed with a configuration 310. The configuration 310 includes a first profile and a second profile with respective user identities (e.g., a1b1c1, x2y2z2) and user roles (e.g., user, administrator). In one example, the user identity may be a Universal Subscriber Identity Module (USIM) identifier and/or an external identifier used by the AF 180. The different user roles of the first profile and the second profile indicate the level of privileges available under the respective user role. For instance, the "user" role may not have privileges to make specific changes to the device configuration, but the "administrator" role may be used for diagnostics and maintenance activities, such as firmware upgrades, which do require specific changes to the configuration of the UE 110.

The configuration 310 of the UE 110 also includes information on network slices (e.g., OPRN slice 130, DIAG slice 140) that are available to the UE 110. The UE 110 may be configured to operate in specific device modes when connected to different network slices. For instance, when the UE 110 connects to the OPRN network slice 130, the UE 110 may be in an operational mode. When the UE 110 connects to the DIAG network slice 140, the UE 110 may be in a maintenance mode. The NEF 160 is programmed with a configuration 312 that associates device modes (e.g., operation, maintenance) with network slices (e.g., OPRN, DIAG).

The UDM 150 is programmed with the configuration 314 that associates user identities (e.g., a1b1c1, x2y2z2, other external identities) with network slices (e.g., OPRN, DIAG). The configuration 314 also associates the user identities that are on the same physical device, such as user identities a1b1c1 and x2y2z2 being on the UE 110. Additionally, the configuration 314 of the UDM 150 includes an indication of mutually exclusive network slices (e.g., OPRN and DIAG are mutually exclusive).

In normal operations, the UE 110 sends a registration 320 to the gNodeB 112 requesting a connection via the OPRN network slice 130 using the user identity a1b1c1. The gNodeB 112 forwards the registration 322 to the network slice 130, which registers the UE 110 with the user identity a1b1c1 on the network slice 130. In this example, the network slice 130 may include functions (e.g., AMF, SMF, UPF) designated for the OPRN network slice 130. The AMF of the OPRN network slice 130 downloads a subscription profile 324 for the user identity a1b1c1 from the UDM 150. The OPRN network slice 130 establishes a PDU session 326 with the UE 110, and the UE 110 operates in its operational mode.

When an operator or engineer wants to bring the UE 110 into a maintenance mode (e.g., to install a firmware upgrade), the AF 180 sends a mode change trigger message 330 to the NEF 160. The trigger message 330 includes a time value (e.g., t1) that indicates when the UE 110 should change device modes, an indication of the device mode (e.g., Maintenance) for the UE 110 to change to, and the user identity (e.g., x2y2z2) for the UE 110 to use in the new device mode. In one example, the trigger message 330 may identify the user identity with an external identifier, which the UDM 150 associates with a USIM user profile for the UE 110. The association between the external identifier and the USIM user profile may be stored in the subscription profile 324 that the AMF of the OPRN network slice 130 downloaded. In another example, the trigger message 330 may change the device mode and/or the user identity of the UE 110. Additionally, the time value in the trigger message 330 may be omitted (e.g., for an immediate trigger to change device mode/user identity), or may be a relative or absolute time value to schedule the UE 110 to change device mode at a specific time.

The NEF 160 maps the device mode (e.g., Maintenance) to a network slice (e.g., DIAG) at 332, and sends a trigger message 334 to the OPRN network slice 130 (e.g., to the AMF of the OPRN network slice 130). The trigger message 334 includes an indication of the time value for the UE 110 to switch device modes, the DIAG network slice 140 to which the UE 110 is scheduled to switch, and the user profile (e.g., x2y2z2 or an external identifier) that the UE 110 should use in the new device mode. The trigger message 334 will also identify the UE 110, for example, by the user profile a1b1c1 or by using an external identifier associated with the UE 110. The OPRN network slice 130 may send a message 336 to the UDM 150 to validate that the user profile registered with the OPRN network slice 130 (e.g., a1b1c1) is associated with the user profile indicated in the trigger message 334 (e.g., x2y2z2) to ensure that the trigger message is sent to the UE 110, which is configured with both user profiles. Alternatively, the association between the user profiles may be downloaded to the OPRN network slice 130 as part of the subscription profile 324.

Figure 3B:
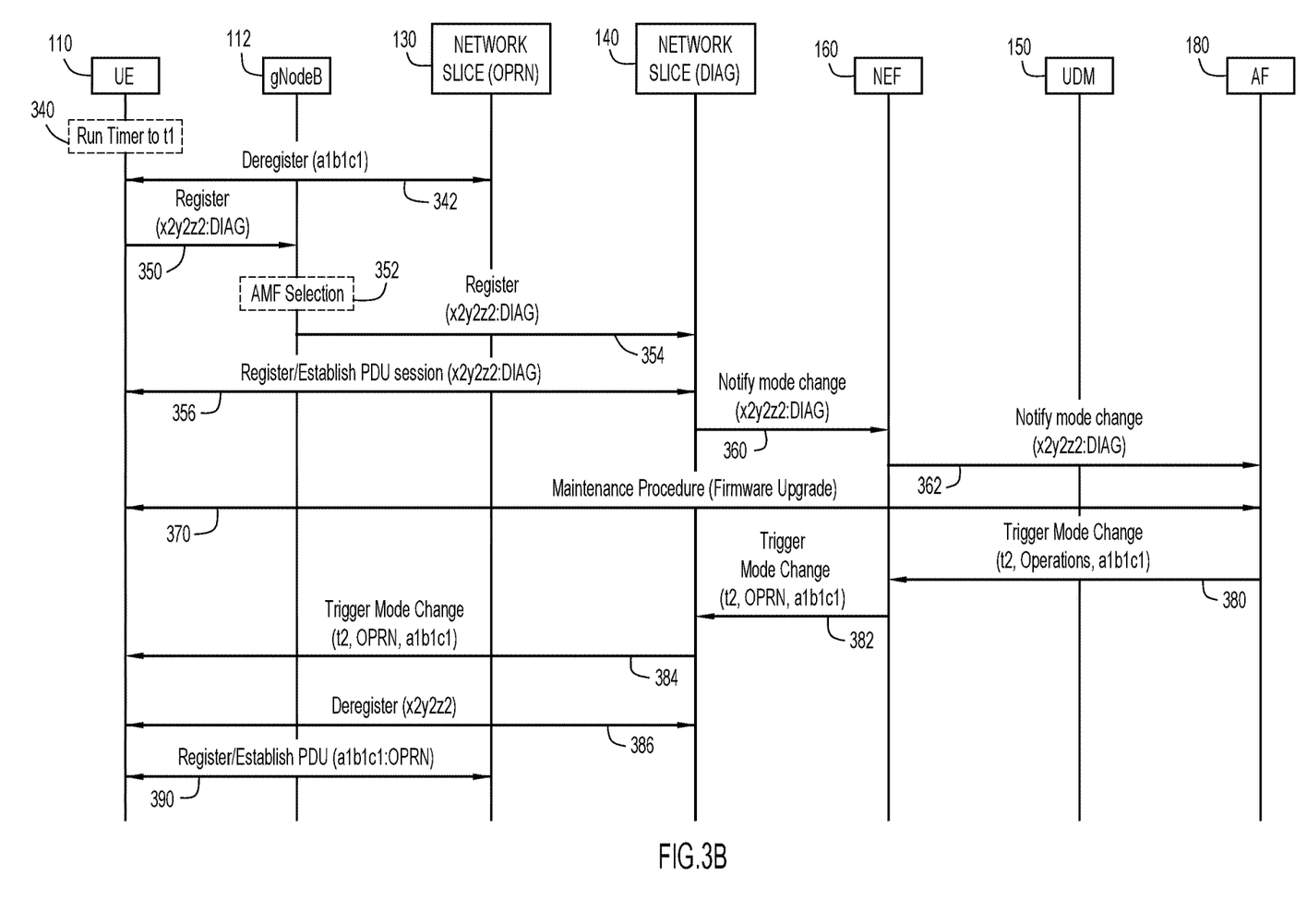
FIG. 3B illustrates messages passed in a 5G system enable a remote application function to install a firmware upgrade on a UE, according to an example embodiment.

The OPRN network slice 130 sends a trigger message 338 to the UE 110 causing the UE 110 to switch network connections to the mutually exclusive DIAG network slice 140, as described further in FIG. 3B. The trigger message 338 may include the time value to switch network connections, the identity of the DIAG network slice 140, and the user profile to use when registering with the DIAG network slice 140.

Referring now to FIG. 3B, a message flow diagram illustrates an example of a UE 110 switching between mutually exclusive network slices 130 and 140 based on a trigger originating from an application function 180 in order to perform a maintenance procedure, such as a firmware upgrade. After receiving the trigger message 338 indicating the UE 110 should initiate a network connection with a mutually exclusive network slice, as shown FIG. 3A, the UE 110 runs a timer 340 until the time indicated in the trigger message 338. In one example, the UE 110 may forgo running the timer 340 if there is no time value indicated in the trigger message 338 or if the time value is a predetermined value that indicates the UE 110 should immediately switch network connections. After the timer 340 expires, or upon receiving the trigger message 338 if no time value is specified, the UE 110 begins the deregistration procedure 342 for the user identity (e.g., a1b1c1) previously registered with the OPRN network slice 130.

Once the UE 110 completes the deregistration procedure 342 to end the network connection with the OPRN network slice 130, the UE 110 sends a registration message 350 to the gNodeB 112. The registration message 350 includes an indication of the user identity (e.g., x2y2z2) from the trigger message 338. The registration message 350 also includes an indication of the DIAG network slice 140 to which the UE 110 is designated to connect by the trigger message 338. The gNodeB 112 performs an AMF selection procedure 352 and sends the registration message 354 to the AMF of the DIAG network slice 140. The UE 110 and the DIAG network slice 140 complete the registration and set up a PDU session 356 via the DIAG network slice 140. At this point, the UE 110 is in the maintenance device mode.

The AMF of the DIAG network slice 140 sends a notification 360 of the device mode change to the NEF 160. The NEF 160 forwards the notification 362 of the device mode change to the AF 180. After receiving the notification 362 of the device mode change in the UE 110, the AF 180 starts a maintenance procedure 370 (e.g., a firmware upgrade). In one example, the AF 180 is not limited to performing one maintenance procedure 370 and may perform other maintenance tasks for the UE 110 while the UE 110 is in the maintenance device mode.

Once the maintenance procedure 370 is complete, the AF 180 sends another trigger message 380 to the NEF 160 in order to return the UE 110 to the operations device mode. The trigger message 380 includes a time value (e.g., t2), a device mode (e.g., operations), and a user identity (e.g., a1b1c1) for the UE 110. The NEF 160 sends a trigger message 382 to the DIAG network slice 140, to which the UE 110 is currently connected. The trigger message 382 includes an indication of the network slice (e.g., OPRN network slice 130) and user identity (e.g., a1b1c2) for the new connection, and may include a time value to switch network connections. The DIAG network slice 140 forwards the trigger message 384 to the UE 110, which causes the UE 110 to start a deregistration procedure 386 for the user identity (e.g., x2y2z2) registered on the DIAG network slice 140. Once the network connection with the DIAG network slice 140 is ended, the UE 110 registers again with the OPRN network slice 130 and establishes a PDU session 390 with the OPRN network slice 130. After the PDU session 390 is established, the UE 110 is in the operations device mode.

Figure 4:
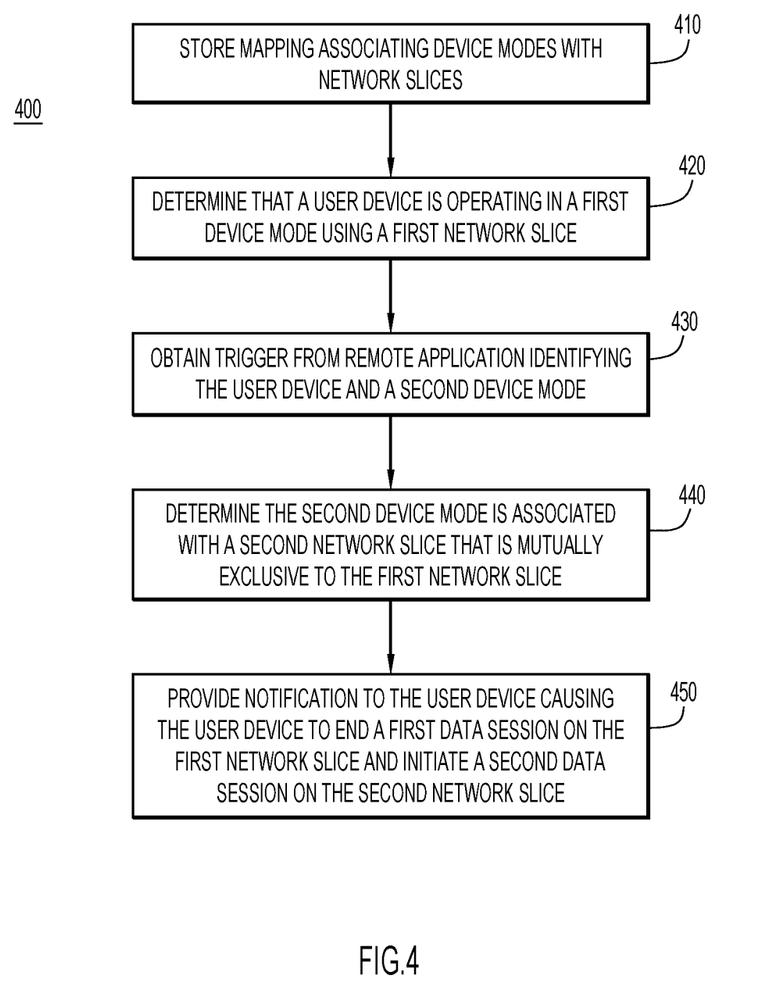
FIG. 4 is a flowchart illustrating operations performed at a Network Exposure Function (NEF) in forwarding a trigger from a remote application to a UE to switch connections between mutually exclusive network slices, according to an example embodiment.

Referring now to FIG. 4, a flowchart illustrates operations performed by a Network Exposure Function (e.g., NEF 160) in a process 400 for relaying a trigger from an application function to switch a UE between mutually exclusive network slices. At 410, the NEF stores a mapping associating device modes with network slices. In one example, the device modes may include operations and maintenance device modes, each of which is associated with a separate, mutually exclusive network slice. At 420, the NEF determines that a user device is operating in a first device mode using a first network slice. In one example, a component of the first network slice (e.g., the AMF of the first network slice) may notify the NEF of the network connection with the user device. The NEF may determine the user device is operating in the first device mode based on the network connection with the first network slice.

At 430, the NEF obtains a trigger from a remote application function. The trigger identifies the user device and a second device mode. In one example, the trigger may also include a time value and/or a user profile. At 440, the NEF determines that the second device mode is associated with a second network slice that is mutually exclusive to the first network slice. In one example, the NEF may query a UDM to determine that the first network slice and the second network slice are mutually exclusive. At 450, the NEF provides a notification to the user device, causing the user device to end a first data session on the first network slice and to initiate a second data session on the second network slice. In one example, the notification may also include a specified time to end the first data session. In another example, the notification may include an indication of a user profile for the user profile to register on the second network slice.

Figure 5:
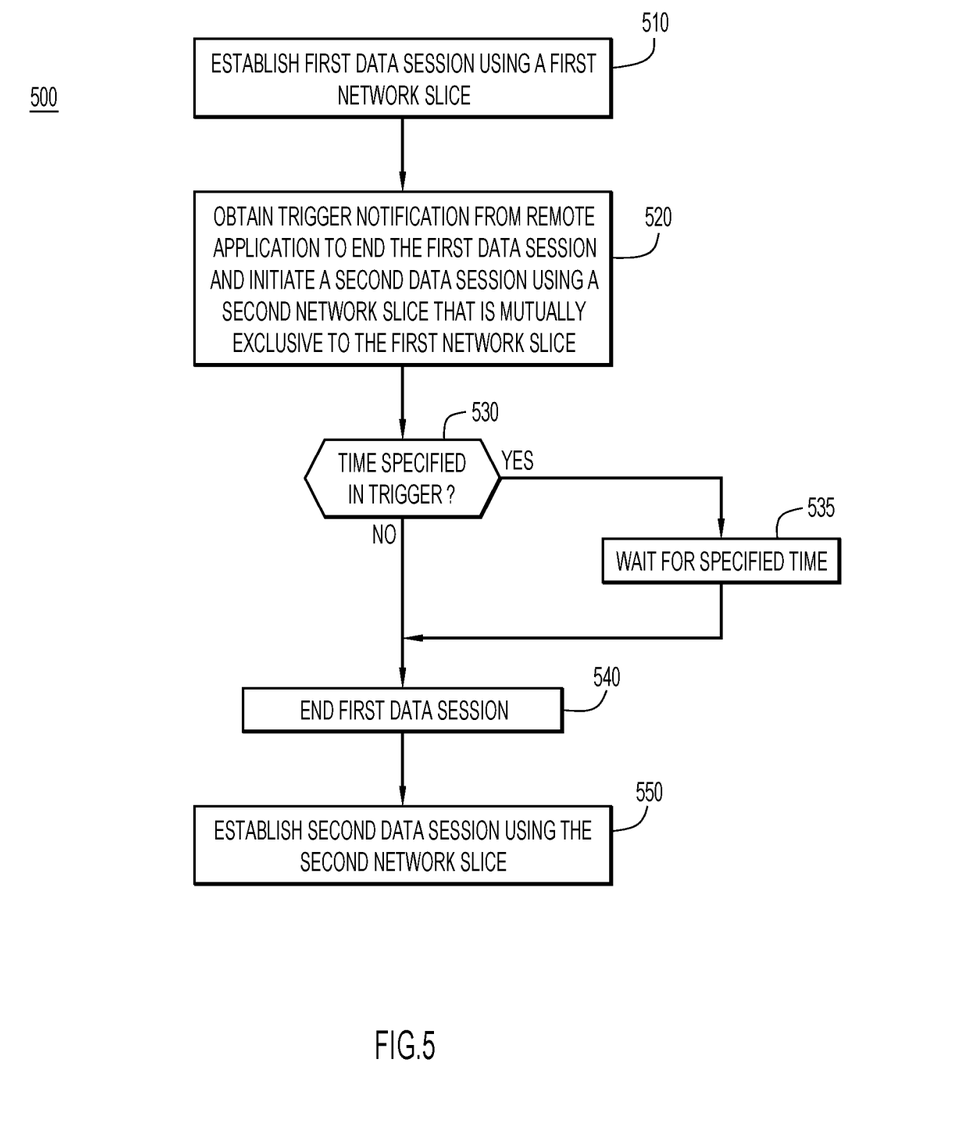
FIG. 5 is a flowchart illustrating operations performed at a UE to switch network connections between mutually exclusive network slices based on a trigger from a remote application function, according to an example embodiment.

Referring now to FIG. 5, a flowchart illustrates operations performed by a UE (e.g., UE 110) in a process 500 for switching between mutually exclusive network slices based on a trigger from a remote application function. At 510, the UE establishes a first data session using a first network slice. In one example, the first network slice may be an URLLC network slice associated with an operations device mode. At 520, the UE obtains a trigger notification from a remote application function to end the first data session and initiate a second data session on a second network slice that is mutually exclusive to the first network slice. In one example, the second network slice may be associated with a maintenance device mode.

If the trigger notification specifies a time to switch network sessions, as determined at 530, then the UE waits for the specified time at 535. In one example, the specified time may be a relative time value (e.g., 10 minutes) or an absolute time value (e.g., 3 AM UTC). After waiting for the specified time, or immediately if no time is specified in the trigger notification, the UE ends the first data session at 540. After the first data session in ended, the UE establishes a second data session using the second data slice at 550. In one example, the trigger notification may include a user profile to use for the second data session.

Figure 6:
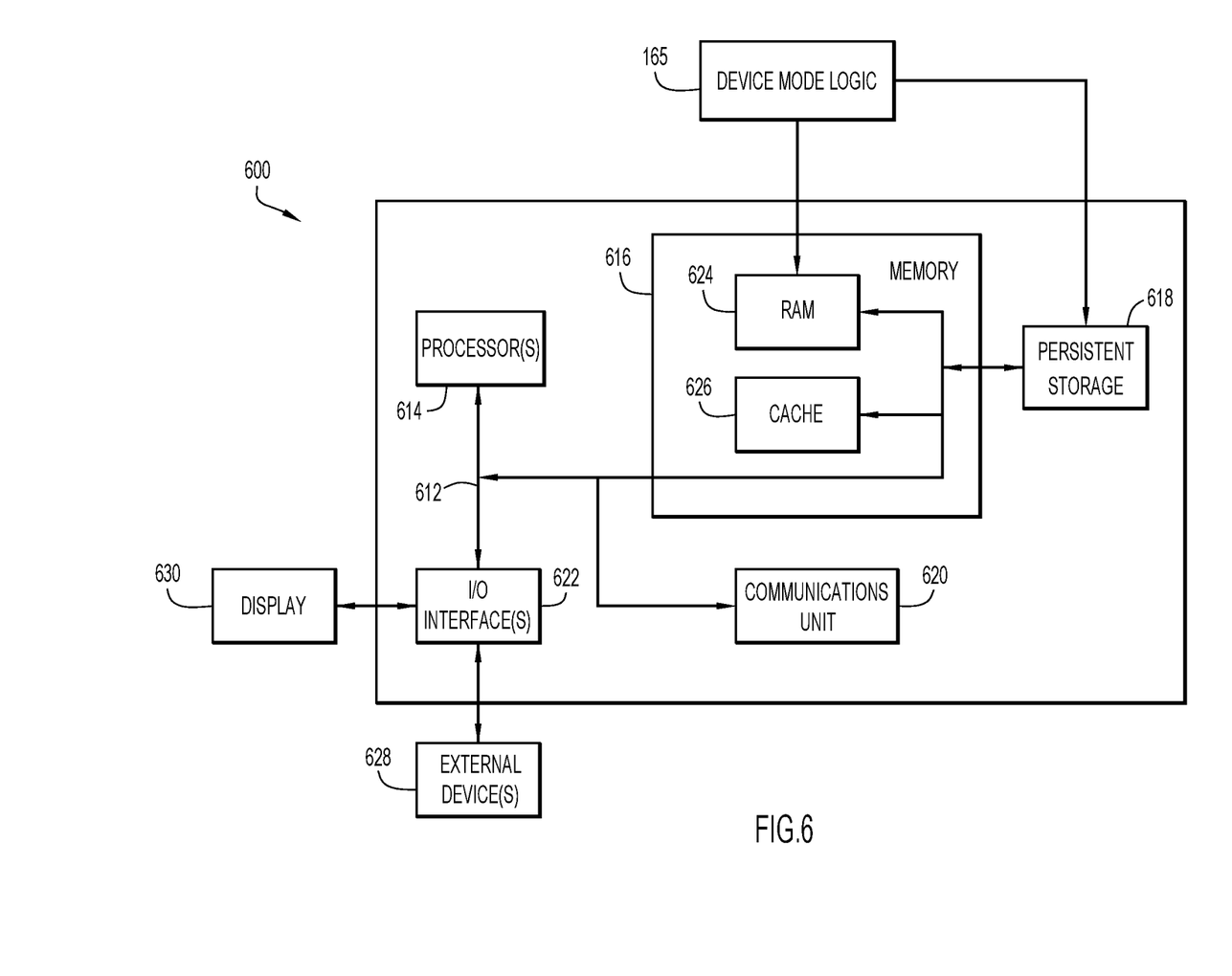
FIG. 6 illustrates a simplified block diagram of a device that may be configured to perform the methods presented herein, according to an example embodiment.

Referring now to FIG. 6, a hardware block diagram illustrates a computing device 600 that may perform the functions of any of the servers or computing or control entities (e.g., network exposure function 160) referred to herein in connection with the 5G system described herein. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the device mode logic 165 may be stored in memory 616 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices (e.g., AF 180, UDM 150, AMF 131, AMF 141, etc.). In these examples, communications unit 620 includes one or more network interface units, such as network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein (e.g., device mode logic 165) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 616 and/or storage 618 can store data, software, code, instructions (e.g., processor instructions), logic, parameters, combinations thereof, and/or the like used for operations described herein. This includes memory elements 616 and/or storage 618 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer usable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein support application-initiated triggering of a UE to switch between mutually exclusive network slices. The trigger from a remote application function is an important tool to enable significant use cases, including switching a device between operations and maintenance device modes on command to perform maintenance tasks, such as firmware upgrades.

In one form, a method is provided to relay a trigger from a remote application function to a user device and cause the user device to switch between mutually exclusive network slices. The method includes storing a mapping associating each of a plurality of device modes with one of a plurality of network slices. The method also includes determining that a user device is operating in a first device mode of the plurality of device modes using a first network slice among the plurality of network slices. The method further includes obtaining a trigger from a remote application function identifying the user device and a second device mode of the plurality of device modes. The method includes determining that the second device mode is associated with a second network slice that is mutually exclusive to the first network slice. The method also includes providing a notification to the user device, causing the user device to end a first data session on the first network slice and to initiate a second data session on the second network slice.

In another form, an apparatus comprising a network interface, a memory, and a processor is provided. The network interface is configured to communicate with a plurality of computing devices. The processor is coupled to the network interface and the memory, and configured to store a mapping in the memory associating each of a plurality of device modes with one of a plurality of network slices. The processor is also configured to determine that a user device is operating in a first device mode of the plurality of device modes using a first network slice among the plurality of network slices. The processor is further configured to receive a trigger from a remote application function via the network interface. The trigger identifies the user device and a second device mode among the plurality of device modes. The processor is configured to determine that the second device mode is associated with a second network slice that is mutually exclusive to the first network slice. The processor is also configured to cause the network interface to send a notification to the user device. The notification causes the user device to end a first data session on the first network slice and to initiate a second data session on the second network slice.

In still another form, a non-transitory computer readable storage media is provided that is encoded with instructions that, when executed by a processor of a computing device, cause the processor to store a mapping associating each of a plurality of device modes with one of a plurality of network slices. The instructions also cause the processor to determine that a user device is operating in a first device mode of the plurality of device modes using a first network slice of the plurality of network slices. The instructions further cause the processor to obtain a trigger from a remote application function. The trigger identifies the user device and a second device mode among the plurality of device modes. The instructions cause the processor to determine that the second device mode is associated with a second network slice that is mutually exclusive to the first network slice. The instructions also cause the processor to provide a notification to the user device. The notification causes the user device to end a first data session on the first network slice and to initiate a second data session on the second network slice.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   storing a mapping associating each of a plurality of device modes with one of a plurality of network slices;
   determining that a user device is operating in an operating mode of the plurality of device modes using a first network slice among the plurality of network slices;
   obtaining a trigger from a remote application function, the trigger identifying the user device and a maintenance mode of the plurality of device modes;
   determining that the maintenance mode is associated with a second network slice of the plurality of network slices, wherein the first network slice and the second network slice are mutually exclusive; and
   providing a notification to the user device, the notification causing the user device to end a first data session on the first network slice and to initiate a second data session on the second network slice.

2. The method of claim 1, wherein the trigger includes a user profile, and wherein the notification causes the user device to initiate the second data session on the second network slice with the user profile.

3. The method of claim 1, wherein the notification causes the user device to initiate the second data session on the second network slice at a specified time.

4. The method of claim 3, wherein the specified time is based on a time value included in the trigger.

5. The method of claim 1, further comprising: obtaining a first message from the second network slice, the first message indicating that the user device is registered with the second network slice; determining that the user device is operating in the maintenance mode; and providing a second message to the remote application function, the second message indicating that the user device is operating in the maintenance mode.

6. The method of claim 1, further comprising: obtaining a second trigger from the remote application function, the second trigger identifying the user device and the operating mode; and providing another notification to the user device, causing the user device to end the second data session on the second network slice and initiate a third data session on the first network slice.

7. The method of claim 1, wherein the user device is an Internet of Things (IoT) device.

8. An apparatus comprising:
   a network interface configured to communicate with a plurality of computing devices;
   a memory; and
   a processor coupled to the network interface and the memory, the processor configured to: store a mapping in the memory, the mapping associating each of a plurality of device modes with one of a plurality of network slices; determine that a user device is operating in an operating mode of the plurality of device modes using a first network slice among the plurality of network slices; receive a trigger from a remote application function via the network interface, the trigger identifying the user device and a maintenance mode of the plurality of device modes; determine that the maintenance mode is associated with a second network slice of the plurality of network slices, wherein the first network slice and the second network slice are mutually exclusive; and cause the network interface to send a notification to the user device, the notification causing the user device to end a first data session on the first network slice and to initiate a second data session on the second network slice.

9. The apparatus of claim 8, wherein the trigger includes a user profile, and wherein the notification causes the user device to initiate the second data session on the second network slice with the user profile.

10. The apparatus of claim 8, wherein the notification causes the user device to initiate the second data session on the second network slice at a specified time.

11. The apparatus of claim 10, wherein the specified time is based on a time value included in the trigger.

12. The apparatus of claim 8, wherein the processor is further configured to: receive a first message from the second network slice via the network interface, the first message indicating that the user device is registered with the second network slice; determine that the user device is operating in the maintenance mode; and cause the network interface to send a second message to the remote application function, the second message indicating that the user device is operating in the maintenance mode.

13. The apparatus of claim 8, wherein the network interface is further configured to: receive a second trigger from the remote application function, the second trigger identifying the user device and the operating mode; and send another notification to the user device, causing the user device to end the second data session on the second network slice and initiate a third data session on the first network slice.

14. The apparatus of claim 8, wherein the user device is an Internet of Things (IoT)device.

15. One or more non-transitory computer readable storage media encoded with computer executable instructions to cause a processor in a computing device to: store a mapping associating each of a plurality of device modes with one of a plurality of network slices; determine that a user device is operating in an operating mode of the plurality of device modes using a first network slice among the plurality of network slices; obtain a trigger from a remote application function, the trigger identifying the user device and a maintenance mode of the plurality of device modes; determine that the maintenance mode is associated with a second network slice of the plurality of network slices, wherein the first network slice and the second network slice are mutually exclusive; and provide a notification to the user device, the notification causing the user device to end a first data session on the first network slice and to initiate a second data session on the second network slice.

16. The non-transitory computer readable storage media of claim 15, further comprising instructions operable to cause the processor to obtain a user profile included in the trigger, wherein the notification causes the user device to initiate the second data session on the second network slice with the user profile.

17. The non-transitory computer readable storage media of claim 15, further comprising instructions operable to cause the processor to provide the notification to the user device and cause the user device to initiate the second data session on the second network slice at a specified time.

18. The non-transitory computer readable storage media of claim 17, further comprising instructions operable to cause the processor to obtain a time value in the trigger, wherein the specified time is based on the time value.

19. The non-transitory computer readable storage media of claim 15, further comprising instructions operable to cause the processor to: obtain a first message from the second network slice, the first message indicating that the user device is registered with the second network slice; determine that the user device is operating in the maintenance mode; and provide a second message to the remote application function, the second message indicating that the user device is operating in the maintenance mode.

20. The non-transitory computer readable storage media of claim 15, further comprising instructions operable to cause the processor to: obtain a second trigger from the remote application function, the second trigger identifying the user device and the operating mode; and provide another notification to the user device, causing the user device to end the second data session on the second network slice and initiate a third data session on the first network slice.

* * * * *